United States Patent Office 3,187,875
Patented June 8, 1965

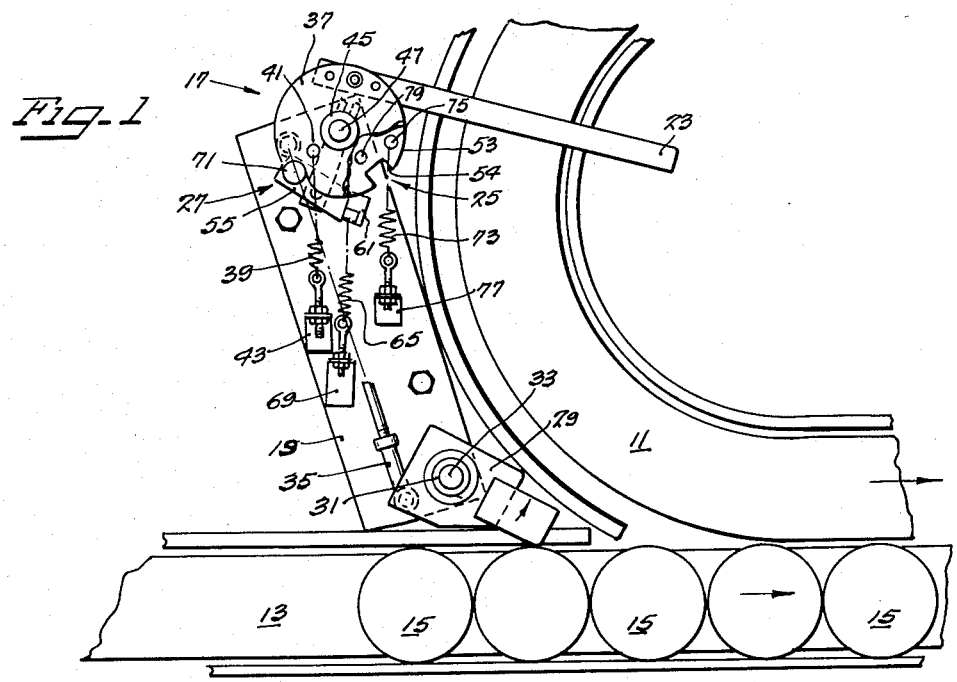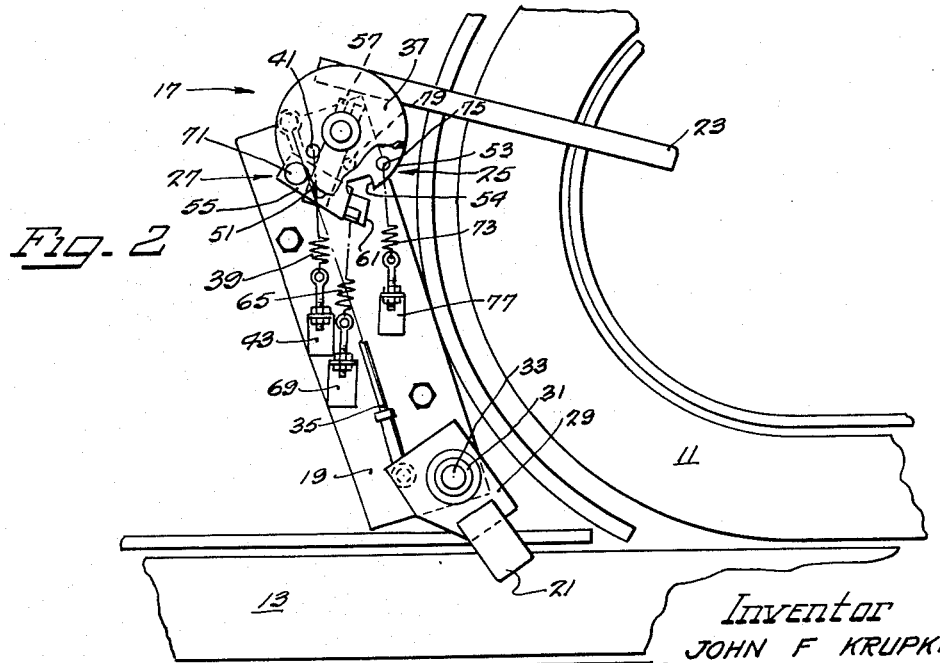

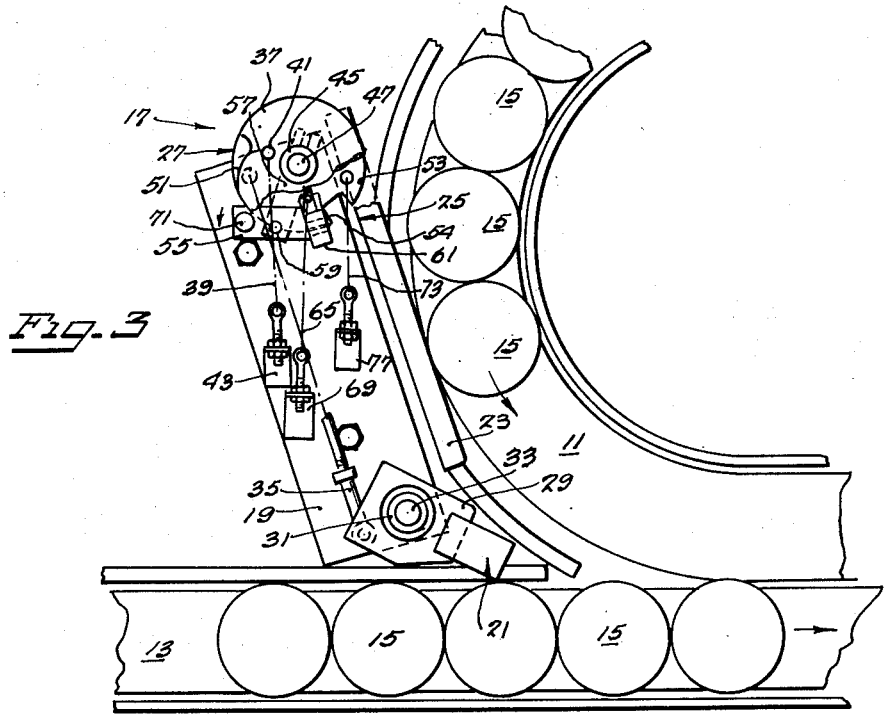
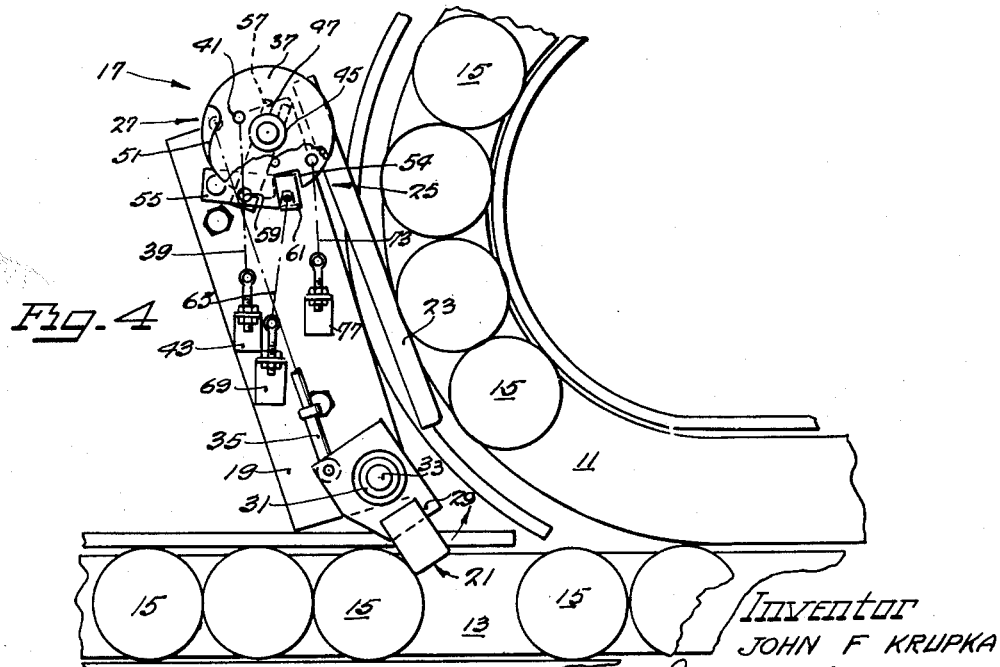

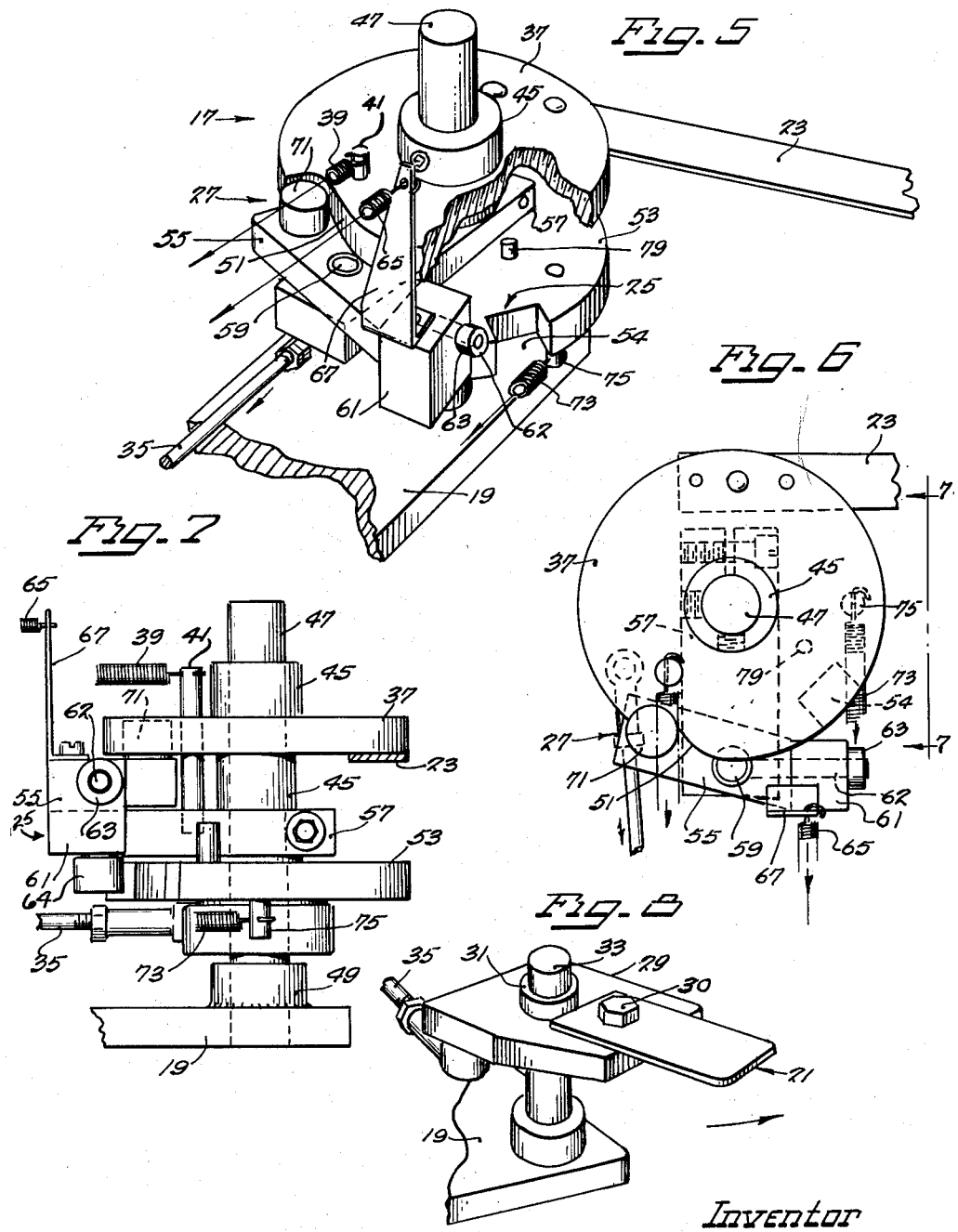

3,187,875
CONVEYOR CONTROL SYSTEM
John F. Krupka, Wilmette, Ill., assignor to National Dairy Products Corporation, Chicago, Ill., a corporation of Delaware
Filed Sept. 6, 1962, Ser. No. 221,746
4 Claims. (Cl. 198—32)

This invention relates to a traffic control system for converging conveyors. More particularly it relates to a device for arresting the movement of articles along one conveyor line in a system of two converging lines, so that the articles traveling along the other conveyor are always given preferential treatment.

Previously many mechanisms have been developed to control the traffic between merging conveyors through the use of movable gates to prevent jamming or derailment of the articles carried along the conveyors at the point of merger. Many of these devices were designed to operate by cutting off electric power to one of the conveyors to temporarily halt its movement. Also, many of these devices gave preference to the articles of whichever conveyor was the first to reach a certain point, thus creating a possibility of a back-up along the non-preferred conveyor. Then too in such prior devices, if articles were to reach both gates simultaneously, the device was rendered inoperative and had to be cleared by hand.

It is an object of this invention to provide an improved system for controlling the traffic between two converging conveyors. It is a further object of this invention to provide a system which will assure continuous flow along one main conveyor, feeding articles from the other conveyor whenever there are gaps in the flow of articles along the main conveyor. It is a further object to provide an improved system suitable for use with either gravity-type or powered conveyors. It is a still further object to provide a simple mechanical device for controlling the traffic between two converging conveyors.

These and other objects of the invention are more particularly set forth in the following detailed description and in the accompanying drawings of which:

FIGURE 1 is a plan view of a conveyor system with articles moving along the feed conveyor only.

FIGURE 2 is a view similar to FIGURE 1 with articles on neither of the conveyors.

FIGURE 3 is a view similar to FIGURE 1 with articles on both the conveyors, with the latching means in the intermediate position.

FIGURE 4 is a view similar to FIGURE 3, with the latching means in the locked position.

FIGURE 5 is an enlarged fragmentary perspective, partially broken away, of the latching means.

FIGURE 6 is a plan view of the latching means shown in FIGURE 5.

FIGURE 7 is a right side elevation view of FIGURE 6.

FIGURE 8 is an enlarged fragmentary perspective view of the first gate member.

The invention provides a simple mechanical device for controlling the traffic along two converging conveyors, so that the article flow along the main conveyor is given preference and never interrupted. Generally, with reference to FIGURE 1, the invention provides a mechanical latching means 25 suitable for locking a first gate member 21 in a position generally transversely across a feeder conveyor 13, where it will arrest the flow of articles along the conveyor without stopping the conveyor itself so as not to affect operations at the rear of the feeder conveyor line. Whenever a second gate member or control member 23, positioned normally transversely across the main or preferred conveyor 11, is engaged and pivoted by articles moving therealong and approaching the point of merger, the latching means 25 is moved to an intermediate or ready position. If at this time the first gate member 21 is not in engagement with an article on the feed conveyor 13, the latching means 25 is immediately locked. If the first gate member 21 is currently engaged, the latching means 25 remains in the ready position until the article has passed. Then, as soon as the first gate member is released, the latching means 25 locks the first gate member 21 in a position where it will block the articles passing along the feed conveyor. When a gap appears in the flow of articles along the main conveyor 11, the second gate member 23 swings back across the conveyor and releases the latching means, allowing the feed conveyor 13 to once again send articles to the point of junction.

Referring now more specifically to the drawings, FIGURES 1-4 illustrate a traffic control system embodying various of the features of the invention. A conveyor 11, referred to as the main conveyor, and a conveyor 13, referred to as the feeder conveyor, converge into a single conveyor line (not shown). The invention is especially useful in regulating the traffic flow along a pair of power-driven conveyors which must be kept continuously running so as not to interfere with operations at the heads of the conveyors, and will be described in respect to such a pair of conveyors having endless belts which will easily slide under blocked articles. However, it is readily apparent that the invention can also be used with gravity-powered or intermittently run conveyors.

To regulate the flow of articles 15 along the conveyors and thus eliminate jam-ups, a traffic control device 17 is provided, located between the conveyors 11, 13. The control device 17 includes a supporting frame 19. The articles 15 are shaped to depict articles such as cans or glass jars having circular cross-sections, but it is clear that the flow of other articles can likewise be regulated.

To physically contact the articles passing along the conveyors 11 and 13, the pair of gate members 23 and 21, respectively, are provided. To allow the gate member 21 to be locked in place across the feeder conveyor 13 so as to block the passage of articles 15 therealong, a latching means 25 is provided. In order to actuate the latching means 25 in response to movement of the gate member 23, a camming means 27 is provided.

The first gate member 21 (see FIG. 8) is fixedly mounted on a pivotal block 29 as by a bolt 30. The block 29 contains a bearing 31 and pivots about a vertical shaft 33 carried by the frame 19. A connecting arm 35 is pivotally secured to the underside of one corner of the block 29. The connecting arm 35 links the block 29 to the latching means 25 to transmit the movement of the first gate member 21 thereto. Generally, the gate member 21 is pivotable from a passing position with respect to the feeder conveyor 13, as shown in FIGURE 3, to a generally transverse blocking position, as shown in FIGURE 4. The gate member 21 is normally biased to this blocking position as will be later described.

The second gate member 23 (FIG. 6) is fixedly mounted on a generally circular cam element 37 which forms a part of the camming means 27. The second gate member 23 is located so as to pivot between a passing position with respect to the main conveyor 11, as shown in FIG. 3, and a transverse or engaging position, as shown in FIG. 1. The gate member 23 is biased to the transverse position by a spring 39 which is attached at one end to a supporting pin 41 mounted on the upper surface of the cam element 37 and adjustably attached at its other end to the frame 19 by a suitable bracket and eye assembly 43.

The cam element 37 contains a center bearing (not shown) and is rotatably mounted between a pair of collars 45 upon a main vertical shaft 47. The main shaft 47 is secured to the supporting frame 19 in any suitable manner, as by a collar 49 welded to the upper surface of the frame 19. The cam element 37 contains a concave-convex surface 51 which serves to actuate the latching means 25.

The latching means 25 comprises a circular disc 53 rotatably mounted on the shaft 47 below the cam element 37. The disc 53 has a notch 54 cut out from its periphery, the function of which will be hereinafter described.

To provide a pivot point for a latch bar 55, a supporting arm 57 is fixedly mounted on the shaft 47 at a position between the cam element 37 and the disc 53. The latch bar 55 pivots on a small shaft 59 fixedly set in the supporting arm 57 at a point near the end thereof. To provide for locking engagement between the latch bar 55 and the disc 53, a dog 61 is pivotally attached to one end of the latch bar 55. The dog 61 is supported upon a horizontal shaft 62 which is set into the end of the latch bar 55 and is held in position as by a cap 63 pressed over the end of the shaft 62. The dog 61 carries a roller 64 which is proportioned to fit into the notch 54 in the disc 53 and lock the latching means 25. The dog 61 is biased to this locking position by a tension spring 65, one end of which is connected to a bracket 67 fixedly secured to the upper surface of the dog 61 (FIGURE 5). The other end of the spring 65 is adjustably attached to a bracket and eye assembly 69 mounted on the frame 19. The spring 65 thus biases the dog 61 in a counterclockwise direction, as viewed in FIGURE 7. At the same time, the spring 65 also serves to bias the latch bar 55 in the clockwise direction, as viewed in FIGURE 6, thus keeping a cam follower 71, which is mounted on the latch bar 55, in contact with the camming surface 51.

The disc 53 containing the notch 54 is biased clockwise, as viewed in FIGURE 6 by a tension spring 73. Accordingly, the first gate member 21, which is linked to the disc 53 via the connecting rod 35, is biased to the blocking position by the action of this spring 73. One end of this spring 73 is connected to a pin 75 depending from the lower surface of the disc 53, and the other end of the spring 73 is adjustably attached to a bracket and eye assembly 77 mounted on the frame 19. To limit the clockwise movement of the disc 53, a stop pin 79 is provided on the upper surface of the disc 53. The pin 79 is positioned so that it engages the side of the supporting arm 57 when the disc notch 54 reaches the locking position. As can be seen in FIGURE 2, when the disc 53 is in this position, the connecting arm 35, which is pivotally connected to the underside of the disc 53, holds the first gate member 21 in its blocking position, generally transversely across the feed conveyor 13.

Likewise counterclockwise movement of the cam element 37 is limited in order to position the second gate member 23 transversely across the main conveyor 11 (shown in FIGURE 2). The cam follower 71 and the concave portion of the camming surface 51 cooperate to so limit the rotation of the cam element 37.

In operation, the traffic control device 17 will take the position shown in FIGURE 2 when there are no articles passing along the conveyors. In this position the first gate member 21 is free to be pivoted to the passing position by articles proceeding along the feed conveyor as shown in FIGURE 1. In this connection, the lower disc 53, associated with gate member 21, is free to rotate because the roller 64 is not seated in the notch 54.

When articles are passing along the main conveyor 11 so as to pivot the second gate member 23 to its passing position, the cam element 37 is in its actuating position. In this position, the cam element 37 has pivoted the latch bar 55 counterclockwise so that the roller 64 is positioned to engage the notch 54 as soon as the notch moves into alignment. As previously stated, the spring 65 biases the roller to this notch-engaging position. This intermediate or ready position of the latching means 25 is illustrated in FIGURE 3 and occurs whenever the second gate member 23 arrives at its passing position at a time when a passing article on the feed conveyor 13 is also engaging the first gate member 21.

As soon as the particular article 15 on the conveyor 13 which has been engaging the first gate member 21 has passed, the spring 73 immediately pivots the gate 21 back to its transverse position, shown in FIGURE 4. The disc 53 is accordingly rotated clockwise until the notch 54 therein is aligned with the roller 64. The biased roller 64 snaps into the notch 54, thereby locking the latching means and retaining the gate 21 in the transverse position, blocking the flow of articles along the feed conveyor 13.

As can be seen in FIGURE 4, the gate members are located at positions along the conveyors such that the flow of articles along the feed conveyor 13 is halted in time so that the last article allowed to pass will clear the point of junction before the leading article on the main conveyor 13 reaches this point. Any chance of a collision between articles from the different conveyors is hereby averted. Also, to provide smooth operation of the device 17, the second gate member 23 is sufficiently long that it will be engaged by articles in any of the three positions in the line shown in FIGURE 4. Thus, the latching means 25 will remain locked even though there may be some slight interval between articles being carried along the main conveyor 11.

When there is a gap in the article flow along the main conveyor 11 large enough to allow the gate 23 to be swung back transversely across the conveyor by the spring 39, the latching means 25 is unlocked. In this respect, the cam element 37 rotates counterclockwise on the shaft 47 and the cam follower 71 follows along the camming surface 51 to concave portion thereof because of the biasing effect of the spring 65. When the cam follower 71 reaches the concave portion, the latch bar 55 has been pivoted clockwise a sufficient distance to disengage the roller 64 from the notch 54. Thus, the disc 53 is free to rotate, and the articles on the feed conveyor can pivot the gate 21 to the passing position shown in FIGURE 1.

Thus, there has been disclosed an improved traffic control device suitable for use with two converging conveyors. The device is one solely mechanical in construction which requires no electrical circuitry for its operation. Moreover the device is designed to give preference to the flow of articles on one chosen conveyor, filling in gaps that appear in this flow with articles from the feed conveyor. Thus, the device assures an uninterrupted flow along the chosen conveyor and is especially useful in situations where a back-up cannot be tolerated on a specific conveyor.

The form of the invention shown and described is merely illustrative and such changes as would be expected from one skilled in the art are contemplated as being within the scope of the invention.

Various of the features of the invention are set forth in the following claims.

I claim:

1. A conveyor traffic control device for regulating the movement of articles at the junction of a main conveyor and a feed conveyor so as to always give preference to articles on the main conveyor, which device comprises a frame located near the junction, a gate member and a control member pivotally mounted on said frame, said gate and control members being adapted to extend transversely over the feed and main conveyors, respectively, in positions to engage articles being carried therealong, means biasing said members to said transverse positions, latching means for locking said gate member in said transverse position, freely movable camming means attached to said control member so that said control member remains always pivotable and connected to said latching means, said camming means being operable to lock said latching means in response to pivotal movement of said control member caused by its engagement by articles passing along the main conveyor, whereby passage of articles on the feed conveyor is blocked by said gate member.

2. A conveyor traffic control device for regulating the movement of articles at the junction of a main conveyor and a feed conveyor so as to always give preference to articles on the main conveyor, which device comprises a frame located near the junction, a gate member and a control member pivotally mounted on said frame, said gate and control members being adapted to swing between a passing position and an engaging position extending transversely over the feed and main conveyors, respectively, so as to engage articles being carried therealong, means biasing said members to said transverse positions, latching means for holding said gate member in said transverse position, said latching means being movable between an unlocked position, an intermediate position, and a locked position, means urging said latching means to said locked position, camming means attach to said control member and engaging said latching means, said camming means being operable in response to pivotal movement of said control member to said passing position to move said latching means to said intermediate position wherein said urging means will lock said latching means upon movement of said gate member to said transverse position, thereby blocking passage of articles on the feed conveyor.

3. A conveyor traffic control device for regulating the movement of articles at the junction of a main conveyor and a feed conveyor so as to always give preference to articles on the main conveyor, which device comprises a frame located near the junction, a supporting shaft mounted on said frame, a camming element and a disc rotatably mounted on said shaft, said disc having a notch in its periphery, a gate member and a control member extending over the feed and main conveyors, respectively, and adapted for swinging movement between positions transverse the conveyors and passing positions, whereby movement of articles along said conveyors causes movement of said members to said passing positions, means biasing said members to said transverse positions, latching means linking said camming element and said disc, said latching means including an element engageable with said notch, means connecting said gate member with said disc, and means connecting said control member to said cam element so that movement of said control member to said passing position rotates said cam element thereby actuating said latching means so that said latching element engages said notch upon movement of said gate member to said transverse position and thereby locks said gate member in said transverse position to block flow along the feed conveyor.

4. A conveyor traffic control device for regulating the movement of articles at the junction of a main conveyor and a feed conveyor so as to always give preference to articles on the main conveyor, which device comprises a frame located near the junction, a supporting shaft mounted on said frame, a camming element and a disc rotatably mounted on said shaft, said disc having a notch in its periphery, a gate member supported on said frame and adapted to swing between a position generally transverse the feed conveyor and a passing position upon engagement by each passing article, a control member adapted to swing between a position generally transverse said main conveyor and a passing position, means biasing said members to said transverse positions, latching means linking said camming element and said disc, said latching means including an element engageable with said notch, means connecting said gate member with said disc, and means connecting said control member to said cam element so that movement of said control member to said passing position rotates said cam element actuating said latching means so that said latching element engages said notch upon movement of said gate member to said transverse position locking said gate member in said transverse position to block flow along the feed conveyor.

References Cited by the Examiner
UNITED STATES PATENTS
3,064,792  11/62  Broff _____ 198—32

SAMUEL F. COLEMAN, *Primary Examiner.*

EDWARD A. SROKA, *Examiner.*